(12) United States Patent
Mickle et al.

(10) Patent No.: US 7,747,274 B2
(45) Date of Patent: Jun. 29, 2010

(54) METHOD AND SYSTEM FOR SECURELY COMMUNICATING INFORMATION USING MULTIPLE RF CARRIERS

(75) Inventors: Marlin H. Mickle, Pittsburgh, PA (US);
Joshua Y. Maina, Pittsburgh, PA (US);
Michael R. Lovell, Wexford, PA (US);
Laura A. Schaefer, Pittsburgh, PA (US)

(73) Assignee: University of Pittsburgh - Of the Commonwealth System of Higher Education, Pittsburgh, PA (US)

( * ) Notice: Subject to any disclaimer, the term of this patent is extended or adjusted under 35 U.S.C. 154(b) by 385 days.

(21) Appl. No.: 11/863,655

(22) Filed: Sep. 28, 2007

(65) Prior Publication Data

US 2008/0188257 A1    Aug. 7, 2008

Related U.S. Application Data

(60) Provisional application No. 60/827,463, filed on Sep. 29, 2006.

(51) Int. Cl.
*H04B 7/00* (2006.01)

(52) U.S. Cl. .................. 455/522; 455/108; 455/116; 455/118; 455/137

(58) Field of Classification Search .............. 455/69, 455/522, 7, 108, 116, 118, 136, 137, 154.1; 701/207; 340/10.1, 10.33, 10.5, 539.13, 340/572.3, 825.49
See application file for complete search history.

(56) References Cited

U.S. PATENT DOCUMENTS 5,547,250 A * 8/1996 Childers ............... 297/256.17
5,633,898 A * 5/1997 Kishigami et al. ........... 375/344
6,016,422 A * 1/2000 Bartusiak ..................... 455/76
6,078,593 A * 6/2000 Eames et al. ................ 370/498
6,081,527 A    6/2000 Chappel et al.
6,552,661 B1   4/2003 Lastinger et al.
6,574,333 B1 * 6/2003 Manchester et al. ......... 379/377
7,099,368 B2   8/2006 Santhoff et al.
2001/0008450 A1* 7/2001 Nakazawa .................. 359/124
2003/0035465 A1   2/2003 Takamura
2003/0091122 A1   5/2003 Humphreys et al.
2005/0246094 A1   11/2005 Moscatiello
2006/0187046 A1   8/2006 Kramer

* cited by examiner

*Primary Examiner*—Tan Trinh
(74) *Attorney, Agent, or Firm*—Eckert Seamans Cherin & Mellott, LLC; Philip E. Levy, Esq.

(57) ABSTRACT

Amplitude modulation of multiple carriers provides a pulse width modulated train resulting in a novel and effective communication mechanism to overcome difficulties in certain RF applications, particularly in the area of Radio Frequency Identification (RFID). A novel conceptual pulse is formed and developed using a set of RF frequencies, such as ultra wideband frequencies, amplitude modulated to form a pulse width modulated binary coded signal. The concept is to wirelessly convey information only to a receiver at a specified distance or range. The RF energy may continue on in space, but receivers of the same design would only receive information from a transmitter if the receivers are located at a specified distance. Equivalent receivers at all other distances would see noise.

25 Claims, 6 Drawing Sheets

METHOD AND SYSTEM FOR SECURELY COMMUNICATING INFORMATION USING MULTIPLE RF CARRIERS

CROSS-REFERENCE TO RELATED APPLICATION

This application claims the benefit of U.S. Provisional Application No. 60/827,463, entitled "Communications with Multiple Carriers and Virtual Pulses," which was filed on Sep. 29, 2006, the disclosure of which is incorporated herein by reference.

GOVERNMENT CONTRACT

This work was supported in part by a grant under NSF Contract No. EEC-0203341. The United States government may have certain rights in the invention described herein.

FIELD OF THE INVENTION

The present invention relates to secure data communications, and in particular to a method and system, such as an RFID system, for securely communicating information from one location to another using amplitude modulation of multiple RF carriers.

BACKGROUND OF THE INVENTION

Radio Frequency (RF) devices are quite popular in many ubiquitous applications such as Radio Frequency Identification (RFID) systems and remote sensing. For example, RFID systems consist of a number of radio frequency tags or transponders (RFID tags) and one or more radio frequency readers or interrogators (RFID readers). The RFID tags typically include an integrated circuit (IC) chip, such as a complementary metal oxide semiconductor (CMOS) chip, and an antenna connected thereto for allowing the RFID tag to communicate with an RFID reader over an air interface by way of RF signals. In a typical RFID system, one or more RFID readers query the RFID tags for information stored on them, which can be, for example, identification numbers, user written data, or sensed data. RFID systems have thus been applied in many application areas to track, monitor, and manage items as they move between physical locations.

In many of these applications, it would be convenient and beneficial if the RF energy would go to a boundary and stop, as in the situation where a wire is used to electronically transmit information. Such a boundary is one advantage of a wire. There is, however, little hope of a sharp boundary with RF energy transmitted in space. Alternatively, it would be useful in, for example, the above described application, if the data transmitted in the form of RF energy were to stop at a fixed boundary or "appear" at a fixed point while the RF energy may continue off into space as noise. For example, it would be convenient to read an RFID tag in a shopping cart in one aisle while not reading any tags from a cart in a neighboring aisle(s). In other words, if RF energy in general cannot be constrained to a boundary, it would still be beneficial to be able to constrain the data that is being transmitted using the RF energy to the desired boundary(ies).

SUMMARY OF THE INVENTION

According to the present invention, amplitude modulation of multiple carriers provides a pulse width modulated train resulting in a novel and effective communication mechanism to overcome difficulties in certain RF applications, particularly in the area of Radio Frequency Identification (RFID). A novel conceptual pulse is formed and developed using a set of RF frequencies, such as ultra wideband frequencies, amplitude modulated to form a pulse width modulated binary coded signal. The fundamental concept is to wirelessly convey information only to a receiver at a specified distance or range. The RF energy may continue on in space, but receivers of the same design would only receive information from a transmitter if the receivers are located at a specified distance. Equivalent receivers at all other distances would see noise. The particular example described herein is implemented using several ISM frequencies to describe the concept using unlicensed bands, but this should not be seen as limiting and it should be understood that other frequencies may also be used.

In one embodiment, the invention provides a method of communicating information from a first location to a second location based on a first pulse train having a first pulse width representing a first data value (such as logic "1") and a second pulse train having a second pulse width representing a second data value (such as logic "0"). The method includes steps of choosing a plurality of RF frequencies and selectively transmitting a first combined RF signal a second combined RF signal a chosen number of times and in a chosen order to represent a desired data stream. The first combined RF signal is based on a plurality of first RF signals, wherein each respective first RF signal has a frequency equal to a respective one of the RF frequencies and a power equal to a respective first transmission power level. Similarly, the second combined RF signal is based on a plurality of second RF signals, wherein each respective second RF signal has a frequency equal to a respective one of the RF frequencies and a power equal to a respective second transmission power level. The method further includes receiving the first combined RF signal and the second combined RF signal at the second location. The first transmission power levels are chosen so that as a result of attenuation of the first combined RF signal between the first location and the second location, the first pulse train may be reconstructed from the received first combined RF signal and the second transmission power levels are chosen so that as a result of attenuation of the second combined RF signal between the first location and the second location, the second pulse train may be reconstructed from the received second combined RF signal. Preferably, the first combined RF signal is generated by generating the plurality of first RF signals and combining the first RF signals to form the first combined RF signal, and the second combined RF signal is generated by generating the plurality of second RF signals and combining the second RF signals to form the second combined RF signal. Also preferably, the first transmission power levels are chosen so that if the first combined RF signal is received at a location different from the second location, the first pulse train may not be reconstructed from the received first combined RF signal, and the second transmission power levels are chosen so that if the second combined RF signal is received at a location different from the second location, the second pulse train may not be reconstructed from the received second combined RF signal.

In another embodiment, the invention provides a transponder system wherein information is communicated from a first location to a second location using a plurality of RF frequencies based on a first pulse train having a first pulse width representing a first data value and a second pulse train having a second pulse width representing a second data value. The transponder system includes a base station located at the first location. The base station is adapted to: (a) selectively transmit a first combined RF signal from the first location by generating a plurality of first RF signals and combining the first RF signals to form the first combined RF signal, and (b) selectively transmit a second combined RF signal from the first location by generating a plurality of second RF signals and combining the second RF signals to form the second combined RF signal. Each respective first RF signal has a frequency equal to a respective one of the RF frequencies and is generated having a respective first transmission power level, and each respective second RF signal has a frequency equal to a respective one of the RF frequencies and is generated having a respective second transmission power level. The transponder system further includes a transponder adapted to receive, as appropriate, the first combined RF signal and the second combined RF signal at the second location. The first transmission power levels are chosen so that as a result of attenuation of the first combined RF signal between the first location and the second location, the first pulse train may be reconstructed from the received first combined RF signal, and the second transmission power levels are chosen so that as a result of attenuation of the second combined RF signal between the first location and the second location, the second pulse train may be reconstructed from the received second combined RF signal. In addition, the first transmission power levels are preferably chosen so that if the first combined RF signal is received at a location different from the second location, the first pulse train may not be reconstructed from the received first combined RF signal, and the second transmission power levels are preferably chosen so that if the second combined RF signal is received at a location different from the second location, the second pulse train may not be reconstructed from the received second combined RF signal. The transponder system may be an RFID system, in which case the base station is an RFID interrogator and the transponder is an RFID tag.

The second location may be a defined area surrounding a predetermined point in space, in which case the first combined RF signal and the second combined RF signal are transmitted using a directional antenna. Alternatively, the second location may comprise a plurality of points forming a circle around the first location wherein the first location is located at the center of the circle, in which case the first combined RF signal and the second combined RF signal are transmitted using an omni-directional antenna.

In still another embodiment, the invention provides a method of communicating information from a first location to a second location based on a first pulse train having a first pulse width representing a first data value and a second pulse train having a second pulse width representing a second data value. The method in this embodiment includes steps of choosing a plurality of RF frequencies, selectively generating a first amplitude modulated RF signal corresponding to the first pulse train using the RF frequencies and transmitting the first amplitude modulated RF signal from the first location, and selectively generating a second amplitude modulated RF signal corresponding to the second pulse train using the RF frequencies and transmitting the second amplitude modulated RF signal from the first location. The first amplitude modulated RF signal is generated using a respective first transmission power level for each RF frequency and the second amplitude modulated RF signal being generated using a respective second transmission power level for each RF frequency. The method further includes receiving the first amplitude modulated RF signal and the second amplitude modulated RF signal, as appropriate, at the second location. The first transmission power levels are chosen so that as a result of attenuation of the first amplitude modulated RF signal between the first location and the second location, the first data value may be detected from the received first amplitude modulated RF signal. Similarly, the second transmission power levels are chosen so that as a result of attenuation of the second amplitude modulated RF signal between the first location and the second location, the second data value may be detected from the received second amplitude modulated RF signal.

In one particular implementation, the first data value may be detected from the received first amplitude modulated RF signal by reconstructing the first pulse train from the received first amplitude modulated RF signal, and the second data value may be detected from the received second amplitude modulated RF signal by reconstructing the second pulse train from the received second amplitude modulated RF signal. In this implementation, the first transmission power levels are preferably chosen so that if the first amplitude modulated RF signal is received at a location different from the second location, the first pulse train may not be reconstructed from the received first amplitude modulated RF signal, and the second transmission power levels are preferably chosen so that if the second amplitude modulated RF signal is received at a location different from the second location, the second pulse train may not be reconstructed from the received second amplitude modulated RF signal.

In another one particular implementation, the received first amplitude modulated RF signal comprises a plurality of first received RF signals, and the first data value is detected from the received first amplitude modulated RF signal if a power level of each of the first received RF signals falls within a respective corresponding predetermined power level range, and the received second amplitude modulated RF signal comprises a plurality of second received RF signals, and the second data value is detected from the received second amplitude modulated RF signal if a power level of each of the second received RF signals falls within a respective corresponding predetermined power level range.

In yet another embodiment, the invention provides a transponder system wherein information is communicated from a first location to a second location using a plurality of RF frequencies based on a first pulse train having a first pulse width representing a first data value and a second pulse train having a second pulse width representing a second data value. The system includes a base station located at the first location that is adapted to: (a) selectively generate a first amplitude modulated RF signal corresponding to the first pulse train using the RF frequencies and transmit the first amplitude modulated RF signal from the first location, and (b) selectively generate a second amplitude modulated RF signal corresponding to the second pulse train using the RF frequencies and transmit the second amplitude modulated RF signal from the first location. The first amplitude modulated RF signal is generated using a respective first transmission power level for each RF frequency, and the second amplitude modulated RF signal is generated using a respective second transmission power level for each RF frequency. The system further includes a transponder adapted to receive, as appropriate, the first amplitude modulated RF signal and the second amplitude modulated RF signal at the second location. The first transmission power levels are chosen so that as a result of attenuation of the first amplitude modulated RF signal between the first location and the second location, the first data value may be detected from the received first amplitude modulated RF signal, and the second transmission power levels are chosen so that as a result of attenuation of the second amplitude modulated RF signal between the first location and the second location, the second data value may be detected from the received second amplitude modulated RF signal. The first data value may be detected from the received first amplitude modulated RF signal by reconstructing the first pulse train from the received first amplitude modulated RF signal, and the second data value may be detected from the received second amplitude modulated RF signal by reconstructing the second pulse train from the received second amplitude modulated RF signal. Preferably, the first transmission power levels are chosen so that if the first amplitude modulated RF signal is received at a location different from the second location, the first pulse train may not be reconstructed from the received first amplitude modulated RF signal, and the second transmission power levels are chosen so that if the second amplitude modulated RF signal is received at a location different from the second location, the second pulse train may not be reconstructed from the received second amplitude modulated RF signal. Alternatively, the received first amplitude modulated RF signal comprises a plurality of first received RF signals, and the first data value is detected from the received first amplitude modulated RF signal if a power level of each of the first received RF signals falls within a respective corresponding predetermined power level range, and the received second amplitude modulated RF signal comprises a plurality of second received RF signals, and the second data value is detected from the received second amplitude modulated RF signal if a power level of each of the second received RF signals falls within a respective corresponding predetermined power level range. The transponder system may an RFID system, in which case the base station is an RFID interrogator and the transponder is an RFID tag.

In still another embodiment, the invention provides a method of communicating information from a first location to a second location based on a first pulse train having a first pulse width representing a first data value and a second pulse train having a second pulse width representing a second data value. The method selectively amplitude modulating a plurality of RF carrier signals to generate a first amplitude modulated RF signal corresponding to the first pulse train and transmitting the first amplitude modulated RF signal from the first location, and selectively amplitude modulating the plurality of RF carrier signals to generate a second amplitude modulated RF signal corresponding to the second pulse train and transmitting the second amplitude modulated RF signal from the first location, wherein remote from the first location the first data value may be detected from the first amplitude modulated RF signal only when received at the second location, and wherein remote from the first location the second data value may be detected from the second amplitude modulated RF signal only when received at the second location.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
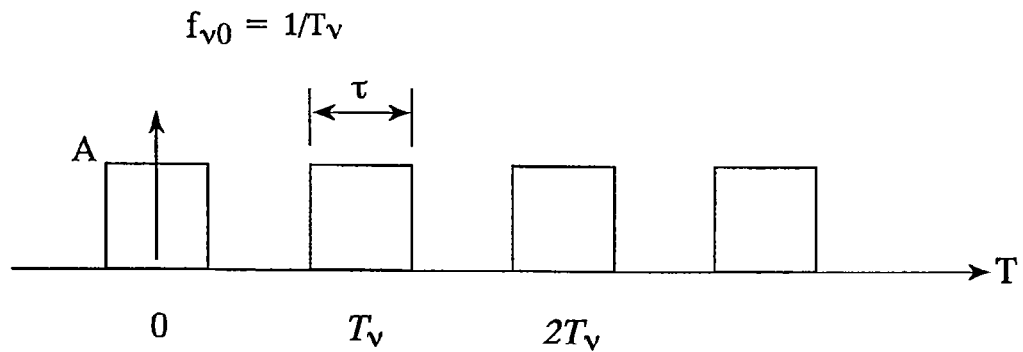
FIG. 1 is a schematic diagram of an exemplary virtual pulse train.

Ultra wide band (UWB) technology has been gaining a great deal of attention in many wireless communications concepts. UWB in one embodiment comprises an extremely short pulse width ultra wide bandwidth. The attractive and enticing characteristics of UWB technology include: immunity to jamming, coexistence with licensed channels, multiple access characteristics.

The original concept of Ultra Wide Band (UWB) communication introduced by Time Domain, Inc., involved the formation and transmission of an extremely short complex pulse that would include a series of frequencies all of which are correlated in time thus making them relatively easy to detect at a very low signal to noise ratios including signals actually below the noise level. This concept has been recently licensed by the FCC. There is concern that although the signal strength in the frequency bands that the actual information travels on is very weak, the future interference with the licensed bands and interference among multiple users of this technology is difficult to predict.

The various embodiments described herein are based on an Ultra Wide concept involving the Industrial, Scientific and Medical (ISM) frequency bands. Thus, the term Ultra Wide ISM (UWISM) may be used herein in describing particular embodiments of the invention. The ISM bands are available for experimentation and some wireless communication implementations (IEEE 802.11 and Bluetooth). However, the ISM bands do not constitute a simple harmonic set for implementing the UWB concepts.

Consider the set of frequency bands making up a set of the ISM bands, e.g., 13.56 MHz, 315 MHz, 418 MHz, 433 MHz, 915 MHz and 2.45 GHz. Approximate center frequencies will be used as the identifiers for the individual frequency bands. Thus, there is a set of bands (frequencies) $F=\{f_1, f_2, \ldots, f_n\}$ which bear no particular harmonic relationship. The technique described herein applies to any set of bands, although the example demonstrations use ISM bands. The use of ISM bands should therefore not be considered to be limiting.

Furthermore, consider two frequencies, $f_i, f_j$, included in F, where the difference of any $[f_i-f_j]$ is the minimum for all $f_i, f_j$, included in F, where $f_i \neq f_j$. With this difference as a basis, further subdivide the difference such that there is some $[f_i-f_j]/m$ where there exists a set of integers $\{a_i\}$ such that for all $f_i$, there exists a an integer, $a_i*[f_i-f_j]/m$, that equals the frequency $f_i$. The $[f_i-f_j]/m$ value thus becomes the fundamental frequency for a virtual pulse string that can be pulse width modulated such that the coefficients making up the Fourier type series representation of the pulse train at two different pulse widths represent either a logic one ("1") or a logic zero ("0").

Thus, within this concept, the virtual pulse is repeated giving a sequence of pulses to communicate data while varying the width at specified times yielding pulse width modulation of the virtual pulse. Using this concept, there is no need to construct a complicated pulse thus overcoming one of the fundamental problems of some UWB concepts. Instead, a set of frequencies can be transmitted with the proper relative amplitudes and phase relationships. Although the modulation is indicated to be 0/1, by considering additional virtual pulse widths it is possible to communicate a larger set of characters.

In the strict sense, two sets of relative amplitudes of the transmitted frequencies identify the transmitted character, e.g., 0 or 1, for a specified time period which defines the baud rate. Thus, at the point of transmission, it would seem that the relevant amplitudes would be transmitted in the proper ratios. However, the relative strengths of the signals will not remain constant as distance from the transmitter increases. It is well known from the radar equation or the Friis equation that the signal magnitude of the frequencies decreases as the distance increases according to the wavelength (frequency) of the transmitted signal (i.e., the extent of the signal attenuation is based/dependent on the wavelength (frequency) of the transmitted signal).

Thus, the transmitted character will appear to be distorted or lost as the distance between the transmitter (e.g., an RFID reader device) and the receiver (an RFID tag or similar transponder) change. However, this apparent difficulty is actually a means of securing the transmission with magnitude encryption as opposed to data encryption for the individual frequencies. The decryption at the specified distance is automatically provided by the attenuation of the signal.

In general, a receiving device for multiple frequencies may implement a detector based on $\Delta_i = |\sin(2\pi f_i t)| - |\sin(2\pi f_{i+1} t)| = k$; $i=1,2,\ldots, n-1$; to indicate the presence of an information signal, say a TRUE or "1" condition, alternatively a FALSE or "0" condition. Thus, an ON/OFF, TRUE/FALSE type keying is possible based on the indicated condition. A more general type of condition can be implemented by allowing k to assume different values ($k_i$) between different frequencies thus making a larger number of symbols possible. There are problems to be considered in the multiple symbol case due to errors and noise. However, for the embodiments described herein, a single k will suffice.

Consider the desire to transmit information to a receiver at a known distance, say m miles. Knowing this distance allows the sender to calculate the attenuation for each frequency/wavelength in accordance with the specified distance. This attenuation can then be compensated for at the transmitter end by adjusting relative transmitted magnitudes of the frequency set, F, such that the proper signal strength ratio is only obtained at the designed distance. For an omni-directional antenna, this would be a circle of radius m miles. However, a directional antenna can be used to more precisely focus the transmitted energy to the desired receiver using a limited azimuth angle.

The UWISM method of communications described herein is intended for friendly cooperation between the transmitter and receiver and is not intended for general radio communication. However, it is significant for specialized secure transmission applications where the signals may otherwise have a relatively poor signal to noise ratio.

With respect to signal construction, it is necessary to look at the coefficients and frequencies making up a typical pulse train. This will be approached by considering the Fourier transform of a pulse train. When the Fourier transform is applied to N samples, it is assumed that the signal is periodic. The fundamental frequency of the signal is equal to the inverse of the time T of the N samples. The fundamental frequency is expressed as:

$$f_0 = 1/T$$

T can be written as a function of sample time, $\tau$, and total number of samples chosen N, to alternately express the fundamental frequency in terms of the sampling frequency $f_s$ and N as follows:

$$f_0 = 1/\tau N = 1/(\text{secs/sample})*\text{Total no. of samples}$$

$$f_0 = f_s/N$$

This frequency, referred to as the fundamental frequency of the signal, is really a type of resolution frequency, meaning the target signal components are resolved into multiples of this resolution frequency. For example, sampling the signal at sample time of $1/900*10^6$ sec and observing $1800*10^6$ samples, then the fundamental frequency is:

$$f_0 = f_s/N = 900*10^6/1800*10^6 = 0.5 \text{ Hz}$$

The Fourier transform is computed by simply multiplying the fundamental frequency by integer multiples with appropriate magnitudes. With $f_0 = 15$ MHz, the next harmonic would be $f_1 = 30$ MHz and so on. An alternate way to view these harmonics of the fundamental frequency is as bins, which collect energy. In the discrete Fourier transform (DFT) they are called cells. Now the $n^{th}$ harmonic can be expressed as n multiplied by $f_0$ or:

$$f_n = n f_0,$$

which is equal to:

$$f_n = n/\tau N = n f_s/N$$

The harmonics of the transform are multiplied by the fundamental frequency to produce individual frequencies of the transform. The coefficients of the individual frequencies in turn are the magnitude of the frequencies. The coefficient becomes the item of interest in the modulation technique described herein.

Consider a virtual pulse train, shown in FIG. 1, having a fixed period $T_v$ and variable pulse duration $\tau_v$. Therefore, because the period is fixed, the fundamental frequency of the DFT is given by:

$$f_{v0} = 1/T_v$$

Taking the DFT of this virtual pulse train provides an ensemble of frequencies that are hypothetically harmonically related. The spectrum of these frequencies constitutes the chosen ISM frequencies along with potentially many other frequencies. The rest of the frequencies, which are non-ISM, may fall within the spectrum already allocated by the FCC and as such are assumed as not being available for RF communications. This problem is resolved by forcing the non-ISM frequency coefficients to be zero.

The set of ISM frequencies are used in the embodiments described herein because they are available for use within specified tolerances and restricted power levels. As indicated previously, the set of ISM frequencies is not harmonically related in the RF spectrum. Therefore, what is termed the virtual pulse concept will be used to find a common denominator that can be considered the virtual fundamental frequency among the chosen ISM frequencies. As an example, consider the following five ISM frequencies, 315 MHz, 418 MHz, 433 MHz, 915 MHz, and 2450 MHz. A common denominator can be found among these numbers which will provide the means for deriving a fundamental frequency to relate the chosen frequencies and allow modulation by varying the pulse width.

A simple technique is to look at the differences between subsequent frequencies moving from the lowest to the highest. The smallest difference between any two frequencies happens to be between 418 MHz and 433 MHz, which is exactly 15 MHz. The fundamental frequency from the DFT of the virtual pulse train of period $T_v$ at 0.06 μs is given by:

$$f_{v0} = 1/T_v = 1/0.06 * 10^{-6} = 15 \text{ MHz}$$

Because the fundamental frequency is known, the multiple for each of the five example ISM frequencies can be found using the relationship $N_{f_{ISM}} * f_{v0} = f_{ISM}$, where, $f_{ISM}$ is the ISM frequency and $N_{f_{ISM}}$ is the harmonic number of the ISM frequency. Hence, for each of the five frequencies the following numbers are the multipliers of the fundamental frequency: $N_{315} = 315/15 = 21$; $N_{418} = 418/15 = 27.867$; $N_{433} = 433/15 = 28.867$; $N_{915} = 915/15 = 61$; $N_{315} = 2450/15 = 163.333$. The expressions can now be written in another way as: $N_{315} * f_0 = 21 * 15 = 315$; $N_{418} * f_0 = 27.867 * 15 = 418$; $N_{433} * f_0 = 28.867 * 15 = 433$; $N_{915} * f_0 = 61 * 15 = 915$; $N_{2450} * f_0 = 163.333 * 15 = 2450$.

When the DFT of the virtual pulse is obtained, the frequencies spread from the dc component to frequencies beyond 2450 MHz. However, for this application, only these five frequencies are utilized, and the remainders of the frequencies within this spectrum are kept at level of zero (switched off). Thus, it is the cumulative energy of these frequencies that represents the information being transmitted.

Figure 2:
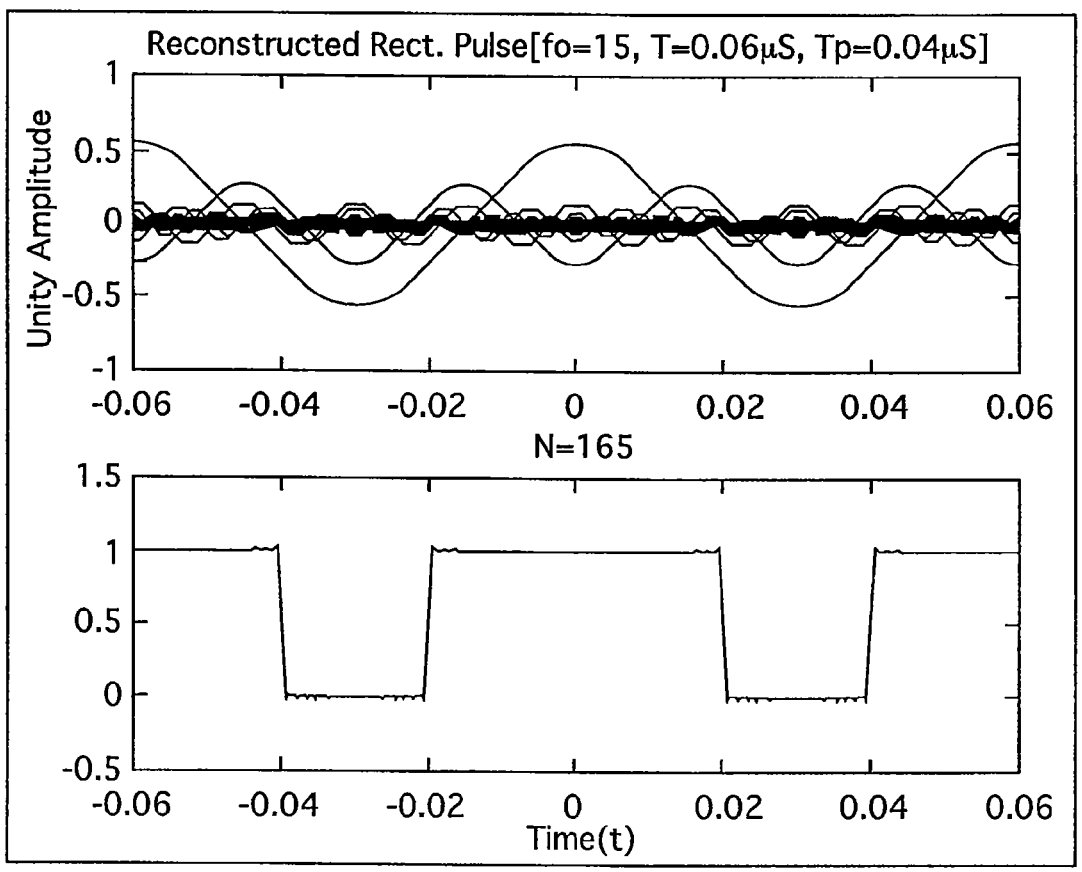
FIG. 2 is a schematic diagram of an exemplary combined RF signal and a rectangular pulse having a fundamental frequency of 15 MHz and a period of 0.06 µs reconstructed therefrom.

One of the essential elements of the concept described herein is the implementation of RF pulse formation for communication. When the frequencies and amplitudes of a Fourier transform are known for a specific pulse train, the Fourier series components can be used to reconstruct the pulse train. As a simple illustration, FIG. 2 shows the reconstructed rectangular pulse having a fundamental frequency of 15 MHz and a period of 0.06 μs. Because of the presence of a number of high frequency components, it can be observed that the Gibbs effect is almost eliminated in the reconstructed rectangular pulses.

To demonstrate the use of a general set, F, consider the ISM frequencies of 315 MHz, 418 MHz, 433 MHz, 915 MHz, and 2450 MHz. These five frequencies are to be combined to form an RF pulse sufficiently distinct to be detected by a correlated receiver. It can be seen here that the modulation technique requires two steps. The first step involves amplitude modulating the individual ISM frequencies to form a five frequency spreading of the bit energy in the form of a digital code. The choice of the respective coefficients for the individual ISM frequencies is carried out with the goal of creating distinct pulses to represent a logic "0" and a logic "1" respectively. The distinction is to be the "width" of the pulse to perform pulse width type modulation. For the purpose of having a clear distinction between the two different pulses, a ratio of 1:2 for bits "1" and "0" may be chosen.

The first pulse is the wider pulse, and therefore some or all of the coefficients used in generating the pulse could be divided into halves to get the set of coefficients for the second pulse. Most of the effort involved in choosing the coefficients happens during the creation of the wider pulse (first pulse). Preferably, the following steps are taken: (1) to avoid having an infinite plain, a boundary of 0.01 to 10.0 is set for choosing of coefficients, and (2) because the effect of some of the frequencies tends to be greater than the others, the frequencies with greater influence on the pulse shape can have coefficients maintained as integer numbers while the frequencies with lesser influence on the pulse shape are maintained as floating point numbers. For the shorter pulse (second pulse), the coefficients of the pulse with greater influence on the pulse shape are reduced to a value as close to half as possible. This has reduced the width of the pulse to at least half.

The pulse is the envelope of the function | sin $\omega_m$t| * sin $\omega_c$t where $\omega_m$ is a modulation frequency and $\omega_c$ is essentially a set of carrier frequencies. The ISM bands are such that a non-integer frequency is readily available. The method of generating these carrier frequencies relies on a conceptual analogy with a Fourier analysis with floating point coefficients for the "harmonics" to generate the set of carrier frequencies.

The choice of coefficients may be a trial and error process, other than possibly the initial choice of the smallest differential between the set of available frequencies. In the described embodiment, these are assumed to be ISM frequencies with no loss to generality. As will be appreciated, the combination of frequencies is given by:

$$f_{0,1} = \sum_{i=1}^{n} a_i \sin \omega_i t.$$

The search process is similar to a combinatorial problem in chemistry. The combinatorial selection in general will be governed by the fading problem at the higher end of the spectrum.

The chosen coefficients are to be based on the distance to the receiver with the transmitter coefficient strengths accounting for the fading of the frequencies. The introduction of fading gives rise to the fixed distance concept described elsewhere herein.

Figure 3:
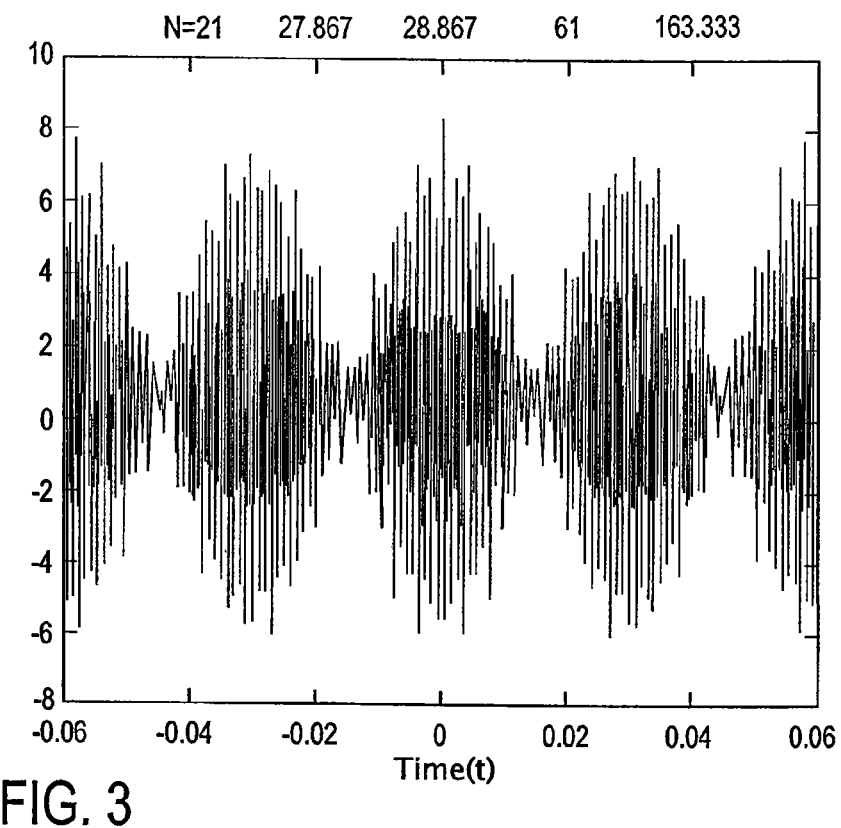
FIGS. 3 and 4 are schematic diagrams showing the results of combining five ISM frequencies using different coefficients to create pulse trains having differing pulse widths according to one exemplary embodiment of the invention.
Figure 4:
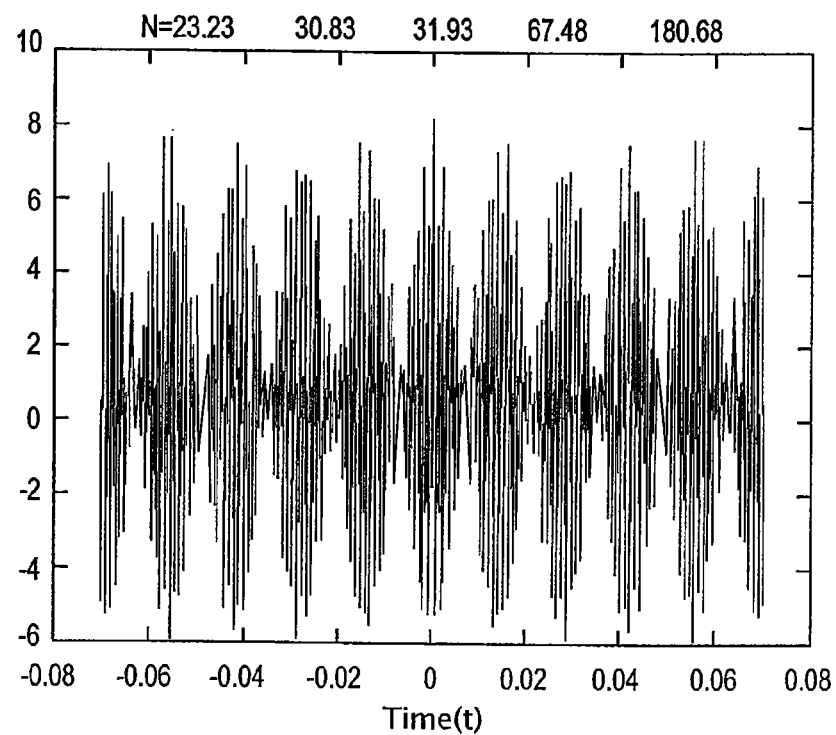

FIG. 3 shows the result of combining the five ISM frequencies within the coefficients: $a_{315}=0.10$, $a_{418}=0.10$, $a_{433}=0.05$, $a_{915}=5.00$, $a_{2450}=0.3$ to create a pulse train according to one exemplary embodiment. These RF pulses (forming the pulse train) transmit a logic/bit "1" to a receiver at the specified distance. FIG. 4 shows a different set of RF pulses constructed by combining the five ISM frequencies and changing the sets of coefficients to: $a_{315}=0.10$, $a_{418}=0.15$, $a_{433}=0.2$, $a_{915}=3.00$, $a_{2450}=0.3$ to create an alternate pulse train according to the exemplary embodiment. These RF pulses (forming the alternate pulse train) transmit a logic/bit "0" to a receiver at the specified distance. By this technique, pulse width modulation is implemented by way of manipulating the coefficients of the individual frequencies whose combination formed the pulses.

Figure 5:
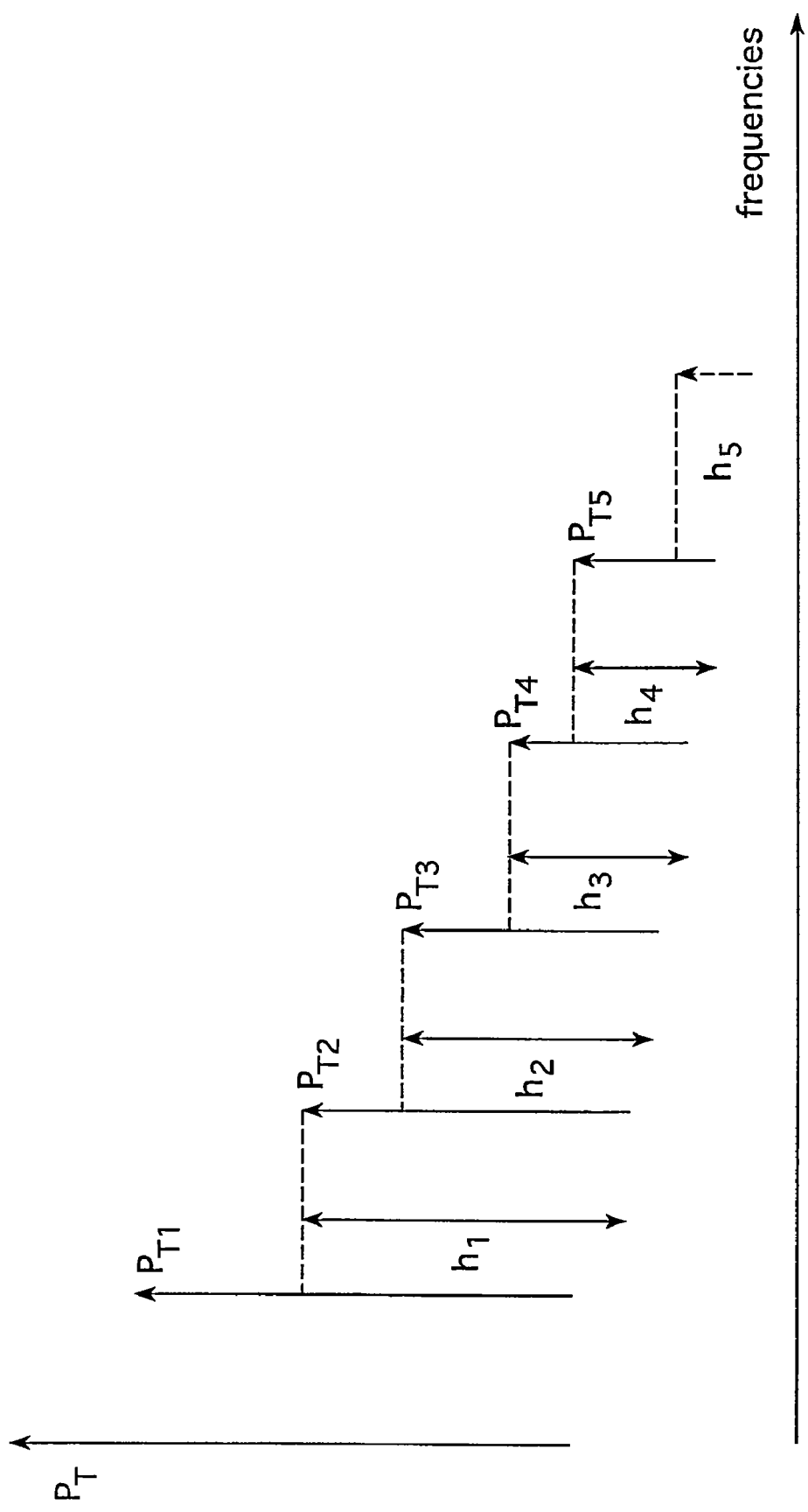
FIG. 5 is a schematic diagram illustrating the relative energy levels at the transmitter side for transmitting a combined RF signal according to one embodiment.

In the present invention, at the transmitter, the energy levels of each modulated channel (the ISM frequencies in the exemplary embodiment being described) are set with respect to the presumed propagation distance and fading effect (due to signal attenuation), such that the correct energy range for the respective information is received at the specified destination. FIG. 5 is an illustration of the relative energy level at the transmitter side, and the same type of relationship is used at the receiver to collect the cumulative energy received. It is important to note that absolute signal strength is determined by the distance between the transmitter and receiver, and the minimum sensitivity of the receiver. The expected cumulative power at each of the multiple frequencies is received only when the receiver is at the proper distance. The expressions for the relative power levels are as follows:

$P_{T1}=h_1/h_2$, $P_{T2}=h_2/h_3$, $P_{T3}=h_3/h_4$, $P_{T4}=h_4/h_5$, $P_{T5}=h_5/h_6$, where, $h_1$, $h_2$, $h_3$, $h_4$, and $h_5$ are the specific power levels of $f_{315}$, $f_{418}$, $f_{433}$, $f_{915}$, and $f_{2450}$ respectively.

The inverse square law can be used to illustrate the relative power levels at the receiver. In practice, the steady fading of $P_T$ may not be realistic because signals having different frequencies fade at different rates due to the difference in wavelengths. A more appropriate relation for the received power in a multiple frequency situation is the radar equation, expressed as follows:

$$P_R = P_T \left[\frac{\lambda}{4\pi D}\right]^2 G_T G_R,$$

where $P_T$ is the transmit power, $G_T$ and $G_R$ are transmitter and receiver gains respectively, D is the distance traveled by the signal, and $\lambda$ is the wavelength of the signal and given by $\lambda = c/f$, where, c is the speed of light in a vacuum ($3*10^8$ meters/second), and f is the frequency of the signal. It can thus be seen that $\lambda$ is a function of the frequency under consideration in this multi-frequency situation.

The relative power levels $P_{R1}$, $P_{R2}$, $P_{R3}$, $P_{R4}$, and $P_{R5}$ at the receiver after $P_{T1}$, $P_{T2}$, $P_{T3}$, $P_{T4}$, and $P_{T5}$ have traveled the distance D from the transmitters can be expressed as follows:

$P_{Ri}=f(P_{Ti}, D)\alpha P_{Ti}\lambda_j/[4\pi D]^2 : i=1,2,\ldots,5; j=315, 418, 433, 915, 2450$ Alternatively, power at the receiver can be represented as:

$P_{Ri}=h_i\lambda_i/[4\pi D]^2\}/\{h_{i+1}\lambda_{i+1}/[4\pi D]^2\}, i=1, 2, \ldots, 5$ The values of $P_{T1}$, $P_{T2}$, $P_{T3}$, $P_{T4}$, and $P_{T5}$ represent the bit "0" or "1." Energy levels of the received signals can be categorized as lower and higher boundaries for the purpose of correct interpretation of the received signal. In the inequality expression below, $1L_{R1}$ and $1U_{R1}$ represent the lower and upper boundaries of received power level which stands for a bit "1" for the first frequency, while $0 L_{R1}$ and $0 U_{R1}$ represent the lower and the upper boundaries of the received energy level which stands for a bit "0" for the first frequency.

$1 L_{Ri} \leq P_{Ri} \leq 1 U_{Ri} \Rightarrow 0 L_{Ri} \leq P_{Ri} \leq 0 U_{Ri} : i=1, 2, \ldots, 5$ Similarly, the rest of the frequencies have their boundaries based on the anticipated fading. Using the radar equation the lower and upper boundaries can be set as follows:

$L_{Ri}=R_{Ri}-(P_{Ri}*0.1)$ and $U_{Ri}=R_{Ri}+(P_{Ri}*0.1)$, where the subscript i is an integer number from 1 to n with n being the maximum number of frequencies. In the exemplary embodiment, n ranges from 1 to 5. These boundaries establish the range for the valid power for the individual multiple frequencies.

Figure 6:
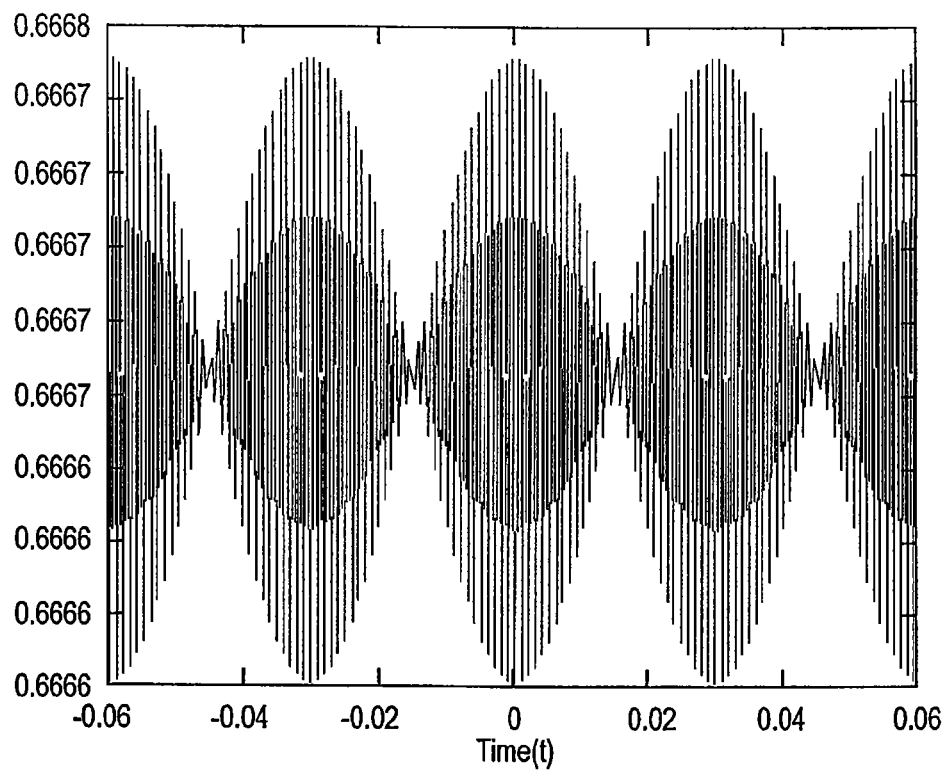
FIGS. 6 and 7 are schematic diagrams showing signals representing a logic "1" and a logic "0", respectively, that are received by a receiver at a specified distance from a transmitter when the signals of FIGS. 3 and 4 are transmitted.
Figure 7:
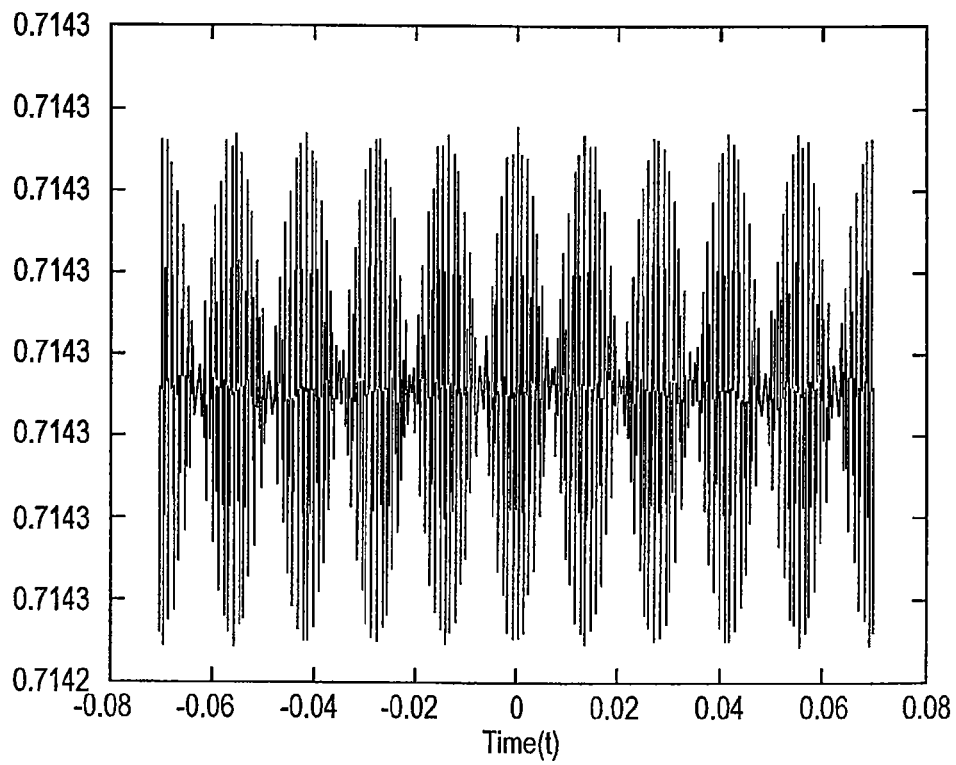
Figure 8:
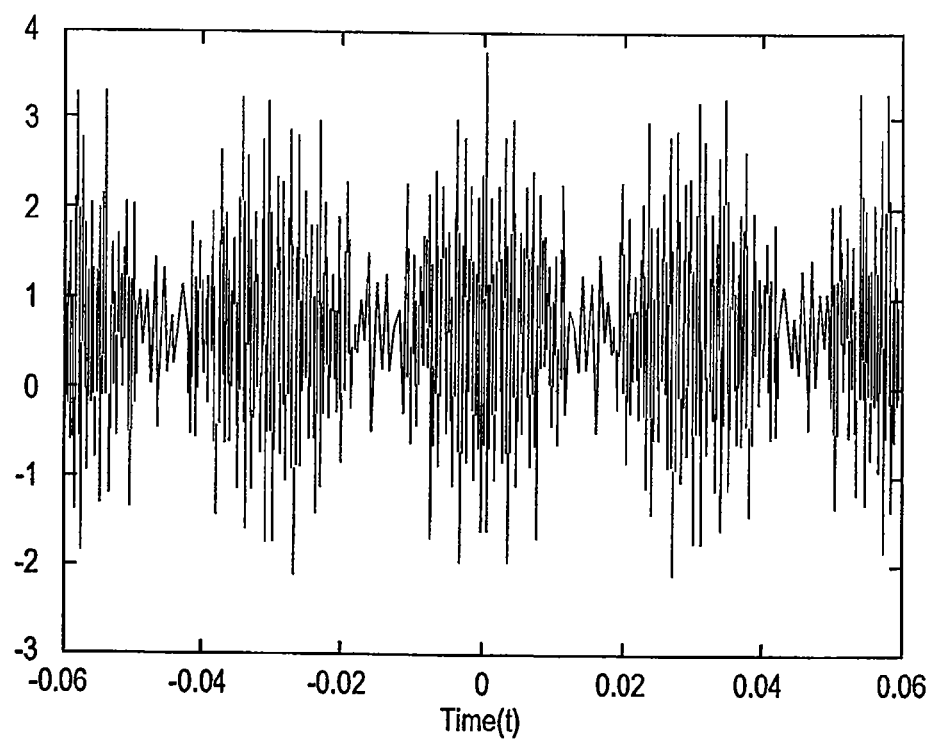
FIG. 8 is a schematic diagram of a deliberately distorted transmitter side combined RF signal and FIG. 9 is a schematic diagram of the received signal corresponding thereto according to another embodiment of the invention.
Figure 9:
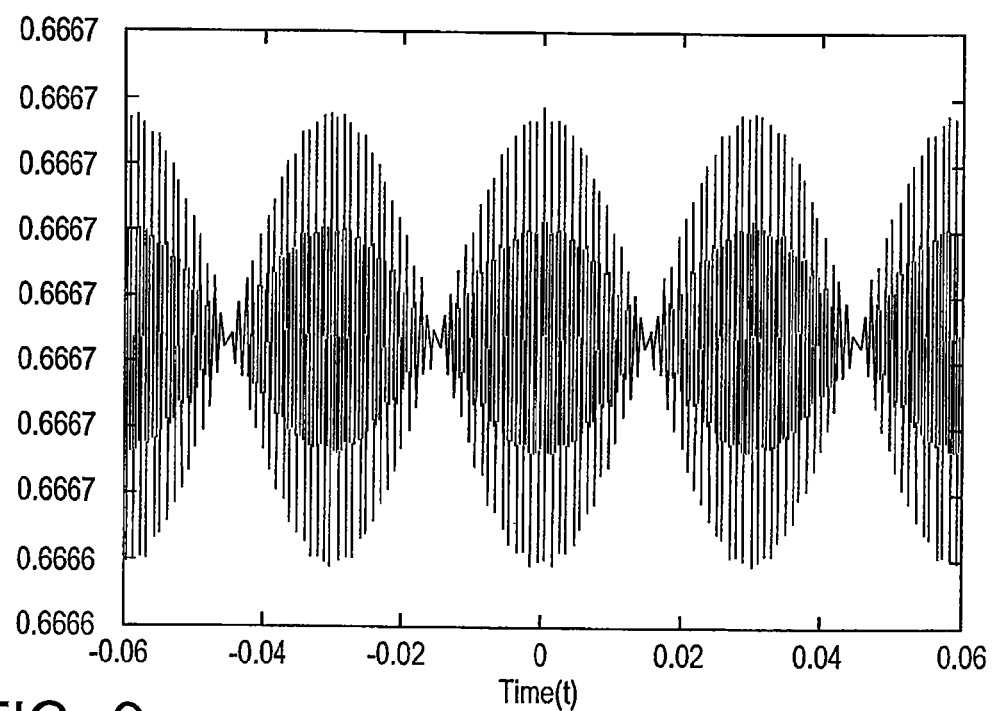

For the five ISM frequencies used in the exemplary embodiment, the received power is expected to differ after traveling the same distance assuming the transmitters power are all set at the same level. Knowing the rate of attenuation for the individual frequencies enables the power for each frequency to be set such that the combined frequencies at the receiver give an expected virtual pulse. For the pulse in FIG. 3 representing a logic "1," the pulse in FIG. 6 is assumed to be received at a distance of 20 meters from the transmitter. A similar result was obtained for the pulse in FIG. 4 representing a logic "0," and FIG. 7 shows the received pulse at a distance of 20 meters from the transmitter. Without encryption, the transmitted signal security can be added by deliberately setting the individual frequencies such that from the transmitter side it appears distorted but at the received end the received pulse appears distinct enough due to the fading effect. An example is shown in FIG. 8 for the transmitted pulse and FIG. 9 for the received pulse. Using the method described herein, only a receiver at the correct distance is able to receive the correct pulse shape for the intended information.

Figure 10:
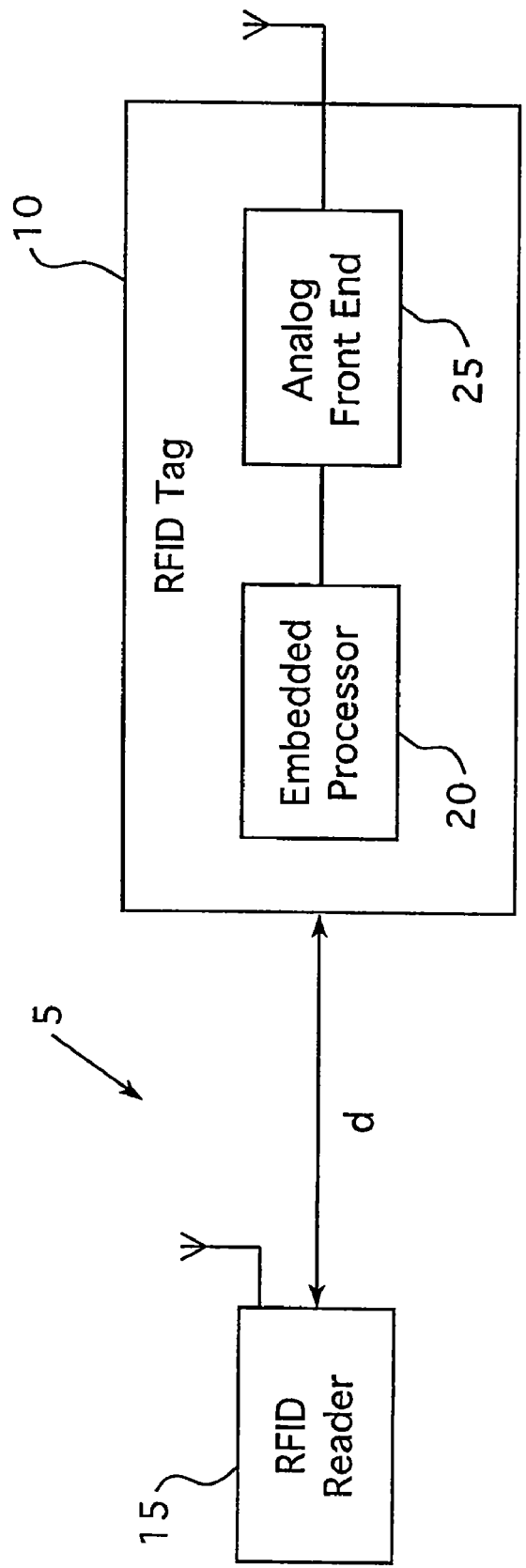
FIG. 10 is a schematic diagram of an exemplary RFID system in which the present invention may be implemented.

FIG. 10 is a schematic diagram of an RFID system 5 in which the present invention may be implemented. The RFID system 5 consists of an RFID tag 10 and an RFID reader 15. The RFID tag 10 includes an embedded processor 20 and an analog front end 25 having receiver and transmitter circuitry. The RFID reader 15 is adapted to combine a plurality of selected RF frequencies as described herein in order to selectively communicate pulse width modulated pulse trains to the RFID tag 10. In addition, as described elsewhere herein, the RFID reader 15 is adapted to transmit the selected RF frequencies with particular magnitudes for each such that the RFID tag 10 will only be able to receive the correct pulse shape for the intended information at the distance d from the RFID reader 15.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of communicating information from a first location to a second location based on a first pulse train having a first pulse width representing a first data value and a second pulse train having a second pulse width representing a second data value, said method comprising:

choosing a plurality of RF frequencies;

selectively transmitting a first combined RF signal from said first location, said first combined RF signal being based on a plurality of first RF signals, wherein each respective first RF signal has a frequency equal to a respective one of said RF frequencies and a power equal to a respective first transmission power level;

selectively transmitting a second combined RF signal from said first location, said second combined RF signal being based on a plurality of second RF signals, wherein each respective second RF signal has a frequency equal to a respective one of said RF frequencies and a power equal to a respective second transmission power level;

receiving said first combined RF signal at said second location, wherein the first transmission power levels are chosen so that as a result of attenuation of the first combined RF signal between said first location and said second location, said first pulse train may be reconstructed from the received first combined RF signal; and receiving said second combined RF signal at said second location, wherein the second transmission power levels are chosen so that as a result of attenuation of the second combined RF signal between said first location and said second location, said second pulse train may be reconstructed from the received second combined RF signal.

2. The method according to claim 1, wherein said first combined RF signal is generated by generating said plurality of first RF signals and combining said first RF signals to form said first combined RF signal, and wherein said second combined RF signal is generated by generating said plurality of second RF signals and combining said second RF signals to form said second combined RF signal.

3. The method according to claim 1, wherein the first transmission power levels are chosen so that if said first combined RF signal is received at a location different from said second location, said first pulse train may not be reconstructed from the received first combined RF signal, and wherein the second transmission power levels are chosen so that if said second combined RF signal is received at a location different from said second location, said second pulse train may not be reconstructed from the received second combined RF signal.

4. The method according to claim 1, wherein said second location is a defined area surrounding a predetermined point in space.

5. The method according to claim 4, wherein said first combined RF signal and said second combined RF signal are transmitted using a directional antenna.

6. The method according to claim 1, wherein said second location comprises a plurality of points forming a circle around said first location wherein said first location is located at the center of said circle.

7. The method according to claim 6, wherein said first combined RF signal and said second combined RF signal are transmitted using an omni-directional antenna.

8. The method according to claim 1, wherein said RF frequencies do not have a harmonic relationship among one another.

9. The method according to claim 1, wherein said first data value is a logic 1 and said second data value is a logic 0.

10. The method according to claim 1, wherein said steps of selectively transmitting a first combined RF signal and selectively transmitting a first combined RF signal are repeatedly performed in a predetermined order in order to create a desired data stream.

11. A transponder system wherein information is communicated from a first location to a second location using a plurality of RF frequencies based on a first pulse train having a first pulse width representing a first data value and a second pulse train having a second pulse width representing a second data value, comprising:
   a base station located at said first location, said base station being adapted to:
   (a) selectively transmit a first combined RF signal from said first location by generating a plurality of first RF signals and combining said first RF signals to form said first combined RF signal, wherein each respective first RF signal has a frequency equal to a respective one of said RF frequencies and is generated having a respective first transmission power level, and
   (b) selectively transmit a second combined RF signal from said first location by generating a plurality of second RF signals and combining said second RF signals to form said second combined RF signal, wherein each respective second RF signal has a frequency equal to a respective one of said RF frequencies and is generated having a respective second transmission power level; and
   a transponder adapted to receive, as appropriate, said first combined RF signal and said second combined RF signal at said second location, wherein the first transmission power levels are chosen so that as a result of attenuation of the first combined RF signal between said first location and said second location, said first pulse train may be reconstructed from the received first combined RF signal, and wherein the second transmission power levels are chosen so that as a result of attenuation of the second combined RF signal between said first location and said second location, said second pulse train may be reconstructed from the received second combined RF signal.

12. The transponder system according to claim 11, wherein the first transmission power levels are chosen so that if said first combined RF signal is received at a location different from said second location, said first pulse train may not be reconstructed from the received first combined RF signal, and wherein the second transmission power levels are chosen so that if said second combined RF signal is received at a location different from said second location, said second pulse train may not be reconstructed from the received second combined RF signal.

13. The transponder system according to claim 11, wherein said transponder system is an RFID system, said base station is an RFID interrogator, and said transponder is an RFID tag.

14. The transponder system according to claim 11, wherein said base station includes a directional antenna, wherein said first combined RF signal and said second combined RF signal are transmitted using said directional antenna, and wherein said second location is a defined area surrounding a predetermined point in space.

15. The transponder system according to claim 11, wherein said base station includes an omni-directional antenna, wherein said first combined RF signal and said second combined RF signal are transmitted using said omni-directional antenna, and wherein said second location comprises a plurality of points substantially forming a circle around said first location and wherein said first location is located at the center of said circle.

16. A method of communicating information from a first location to a second location based on a first pulse train having a first pulse width representing a first data value and a second pulse train having a second pulse width representing a second data value, said method comprising:
   choosing a plurality of RF frequencies;
   selectively generating a first amplitude modulated RF signal corresponding to said first pulse train using said RF frequencies and transmitting said first amplitude modulated RF signal from said first location, said first amplitude modulated RF signal being generated using a respective first transmission power level for each RF frequency;
   selectively generating a second amplitude modulated RF signal corresponding to said second pulse train using said RF frequencies and transmitting said second amplitude modulated RF signal from said first location, said second amplitude modulated RF signal being generated using a respective second transmission power level for each RF frequency;
   receiving said first amplitude modulated RF signal at said second location, wherein the first transmission power levels are chosen so that as a result of attenuation of said first amplitude modulated RF signal between said first location and said second location, said first data value may be detected from the received first amplitude modulated RF signal; and
   receiving said second amplitude modulated RF signal at said second location, wherein the second transmission power levels are chosen so that as a result of attenuation of said second amplitude modulated RF signal between said first location and said second location, said second data value may be detected from the received second amplitude modulated RF signal.

17. The method according to claim 16, wherein said first data value may be detected from the received first amplitude modulated RF signal by reconstructing the first pulse train from the received first amplitude modulated RF signal, and wherein said second data value may be detected from the received second amplitude modulated RF signal by reconstructing the second pulse train from the received second amplitude modulated RF signal.

18. The method according to claim 17, wherein the first transmission power levels are chosen so that if said first amplitude modulated RF signal is received at a location different from said second location, said first pulse train may not be reconstructed from the received first amplitude modulated RF signal, and wherein the second transmission power levels are chosen so that if said second amplitude modulated RF signal is received at a location different from said second location, said second pulse train may not be reconstructed from the received second amplitude modulated RF signal.

19. The method according to claim 16, wherein the received first amplitude modulated RF signal comprises a plurality of first received RF signals, and wherein said first data value is detected from the received first amplitude modulated RF signal if a power level of each of said first received RF signals falls within a respective corresponding predetermined power level range, and wherein the received second amplitude modulated RF signal comprises a plurality of second received RF signals, and wherein said second data value is detected from the received second amplitude modulated RF signal if a power level of each of said second received RF signals falls within a respective corresponding predetermined power level range.

20. A transponder system wherein information is communicated from a first location to a second location using a plurality of RF frequencies based on a first pulse train having a first pulse width representing a first data value and a second pulse train having a second pulse width representing a second data value, comprising:
 a base station located at said first location, said base station being adapted to:
  (a) selectively generate a first amplitude modulated RF signal corresponding to said first pulse train using said RF frequencies and transmit said first amplitude modulated RF signal from said first location, said first amplitude modulated RF signal being generated using a respective first transmission power level for each RF frequency, and
  (b) selectively generate a second amplitude modulated RF signal corresponding to said second pulse train using said RF frequencies and transmit said second amplitude modulated RF signal from said first location, said second amplitude modulated RF signal being generated using a respective second transmission power level for each RF frequency; and
 a transponder adapted to receive, as appropriate, said first amplitude modulated RF signal and said second amplitude modulated RF signal at said second location, wherein the first transmission power levels are chosen so that as a result of attenuation of said first amplitude modulated RF signal between said first location and said second location, said first data value may be detected from the received first amplitude modulated RF signal, and wherein the second transmission power levels are chosen so that as a result of attenuation of said second amplitude modulated RF signal between said first location and said second location, said second data value may be detected from the received second amplitude modulated RF signal.

21. The transponder system according to claim 20, wherein said first data value may be detected from the received first amplitude modulated RF signal by reconstructing the first pulse train from the received first amplitude modulated RF signal, and wherein said second data value may be detected from the received second amplitude modulated RF signal by reconstructing the second pulse train from the received second amplitude modulated RF signal.

22. The transponder system according to claim 21, wherein the first transmission power levels are chosen so that if said first amplitude modulated RF signal is received at a location different from said second location, said first pulse train may not be reconstructed from the received first amplitude modulated RF signal, and wherein the second transmission power levels are chosen so that if said second amplitude modulated RF signal is received at a location different from said second location, said second pulse train may not be reconstructed from the received second amplitude modulated RF signal.

23. The transponder system according to claim 20, wherein the received first amplitude modulated RF signal comprises a plurality of first received RF signals, and wherein said first data value is detected from the received first amplitude modulated RF signal if a power level of each of said first received RF signals falls within a respective corresponding predetermined power level range, and wherein the received second amplitude modulated RF signal comprises a plurality of second received RF signals, and wherein said second data value is detected from the received second amplitude modulated RF signal if a power level of each of said second received RF signals falls within a respective corresponding predetermined power level range.

24. The transponder system according to claim 20, wherein said transponder system is an RFID system, said base station is an RFID interrogator, and said transponder is an RFID tag.

25. A method of communicating information from a first location to a second location based on a first pulse train having a first pulse width representing a first data value and a second pulse train having a second pulse width representing a second data value, said method comprising:
 selectively amplitude modulating a plurality of RF carrier signals to generate a first amplitude modulated RF signal corresponding to said first pulse train and transmitting said first amplitude modulated RF signal from said first location; and
 selectively amplitude modulating said plurality of RF carrier signals to generate a second amplitude modulated RF signal corresponding to said second pulse train and transmitting said second amplitude modulated RF signal from said first location;
 wherein remote from said first location said first data value may be detected from said first amplitude modulated RF signal only when received at said second location, and wherein remote from said first location said second data value may be detected from said second amplitude modulated RF signal only when received at said second location.

* * * * *

UNITED STATES PATENT AND TRADEMARK OFFICE
CERTIFICATE OF CORRECTION

PATENT NO. : 7,747,274 B2
APPLICATION NO. : 11/863655
DATED : June 29, 2010
INVENTOR(S) : Marlin H. Mickle et al.

It is certified that error appears in the above-identified patent and that said Letters Patent is hereby corrected as shown below:

Column 2, line 24, "signal a second" should read --signal and a second--.
Column 4, line 26, "another one particular" should read --another particular--.
Column 5, line 29, "may an" should read --may be an--.
Column 5, line 36, "method selectively" should read --method includes selectively--.
Column 6, line 33, "channels, multiple" should read --channels, and multiple--.
Column 7, line 3, "a an integer," should read --an integer,--.
Column 9, line 38, "at level" should read --at a level--.
Column 11, line 50, " $1 L_{Ri} \leqq P_{Ri} \leqq 1 U_{Ri} \Rightarrow 0 L_{Ri} \leqq P_{Ri} \leqq 0 U_{Ri} : i = 1, 2, \ldots, 5$ "

should read

-- $1 L_{Ri} \leq P_{Ri} \leq 1 U_{Ri} \Rightarrow 0 L_{Ri} \leq P_{Ri} \leq 0 U_{Ri} : i = 1, 2, \ldots, 5$ --.

Column 11, line 53, "radar equation" should read --*radar equation*--.
Column 11, line 58, "subscript i" should read --subscript *i*--.
Column 11, line 58, "n with n" should read --*n* with *n*--.
Column 11, line 60, "n" should read --*n*--.
Column 11, line 65, "transmitters power" should read --transmitters' powers--.
Column 12, line 11, "due the fading" should read --due to the fading--.

Signed and Sealed this

Thirtieth Day of November, 2010

David J. Kappos
*Director of the United States Patent and Trademark Office*